(12) United States Patent
Menabde et al.

(10) Patent No.: US 7,853,439 B2
(45) Date of Patent: Dec. 14, 2010

(54) MINING OPTIMISATION

(75) Inventors: Merab Menabde, Cheltenham (AU); Peter Mitchell Stone, Ripponlea (AU)

(73) Assignee: BHP Billiton Innovation Pty Ltd., Melbourne, Victoria (AU)

( * ) Notice: Subject to any disclaimer, the term of this patent is extended or adjusted under 35 U.S.C. 154(b) by 475 days.

(21) Appl. No.: 11/860,170

(22) Filed: Sep. 24, 2007

(65) Prior Publication Data

US 2008/0046272 A1    Feb. 21, 2008

Related U.S. Application Data

(63) Continuation of application No. PCT/AU2006/000420, filed on Oct. 19, 2006.

(30) Foreign Application Priority Data

Apr. 11, 2005  (AU) .............................. 2005901788
Dec. 9, 2005   (AU) .............................. 2005906941

(51) Int. Cl.
  *G06F 7/60*    (2006.01)
  *G06F 17/10*   (2006.01)
(52) U.S. Cl. .................. 703/2; 299/95; 299/10
(58) Field of Classification Search ...................... 703/2; 299/95, 10
See application file for complete search history.

(56) References Cited

U.S. PATENT DOCUMENTS

2006/0190219 A1    8/2006    Froyland et al.
2006/0265342 A1   11/2006    Froyland et al.

(Continued)

FOREIGN PATENT DOCUMENTS

RU          2004803 C        12/1993

(Continued)

OTHER PUBLICATIONS

Godoy et al. "Managing Risk and Waste Mining in Long-Term Production Scheduling of Open-Pit Mines." Jan. 2004.*

(Continued)

*Primary Examiner*—Kamini S Shah
*Assistant Examiner*—Saif A Alhija
(74) *Attorney, Agent, or Firm*—Brinks Hofer Gilson & Lione; G. Peter Nichols (57) ABSTRACT

A method, system and computer program for modelling an optimal mine plan is disclosed. The life of mine is divided into a plurality of increasing lengths of time (FIGS. 2 and 3) and performing optimisation steps, with each step being performed once for a predetermined time period for the remaining life of mine. Material may be stockpiled or may be sent direct to product or to waste without any stockpiling. A decision (block 10 in FIG. 1) is made as to which material is sent to product in each time period for the remaining life of mine. In each predetermined time period, material with a grade greater than a marginal grade that is not sent to produce is sent to stockpile and all material less than a marginal grade is sent to waste (14). In the remaining life of mine, after the predetermined period, it is required that all material not sent to produce be sent to waste and determining an initial movement of material to and from the stockpile and to and from the mine to product over the life of mine in increasing lengths of time.

9 Claims, 4 Drawing Sheets

U.S. PATENT DOCUMENTS

2007/0185750 A1    8/2007    Menabde

FOREIGN PATENT DOCUMENTS

| RU | 2204719 C | 5/2003 |
|---|---|---|
| UA | 69628 | 9/2004 |
| WO | WO 2004/033853 A | 4/2004 |
| WO | WO 2004/033854 A | 4/2004 |
| WO | WO 2005/124104 A | 12/2005 |

OTHER PUBLICATIONS

Kaden et al. "Decision Support System for open-pit lignite mining areas", 1990.*

Bezdek, J.C. et al., "Convergence Theory for Fuzzy c-Means: Counterexamples and Repairs", *IEEE Transactions on Systems, Man and Cybernetics*, vol. SMC-17, No. 5, pp. 873-877, Sep./Oct. 1987.

Brealey, S.C. et al., "Opencast Mining", *The Mining Engineer, I.M.E.*(UK), No. 99, pp. 147-163, Dec. 1968.

Caccetta, L. et al., "An Application of Branch and Cut to Open Pit Mine Scheduling", http://rutcor.rutgers.edu/~do99/EA/SHill.doc, pp. 1-24, 1999.

Kaas, L.M. et al., "Computer Techniques for Production Scheduling and Blending of Taconite", *Proceedings of the 26$^{th}$ Annual Mining Symposium*, University of Minnesota, pp. 135-144, Jan. 1965.

Lerchs, H. et al. "Optimum Design of Open-Pit Mines", *Transactions, C.I.M*, vol. LXVII, pp. 17-24, 1965.

Pana, M.T., "The Simulation Approach to Open-Pit Design", *Transactions of the Short Course and Symposium on Computers and Computer Applications in Mining and Exploration*, University of Arizona, pp. 1-23, Mar. 1965.

Underwood, R. et al, "A Mathematical Programming Viewpoint for Solving the Ultimate Pit Problem", *EJOR*, pp. 1-18, 1998.

Wharton, C. et al., "The Effect of Minimum Mining Width on NPV", *Proceedings of the 1997 Whittle Conference, "Optimizing with Whittle"*, Perth, WA, pp. 173-178, Apr. 1997.

* cited by examiner

MINING OPTIMISATION

This application is a continuation of and claims priority from PCT/AU2006/000420 published in English on Oct. 19, 2006 as WO 2006/108213, from AU 2005901788 filed Apr. 11, 2005, and from AU 2005906941 filed Dec. 9, 2005, the entire contents of each are incorporated herein by reference.

FIELD OF THE INVENTION

This invention relates to a method, an apparatus and a computer program for optimisation of mining and, in particular, but not exclusively, modelling stockpiles in the determination of an optimal extraction sequence and in the general optimisation of the extraction sequence.

BACKGROUND OF THE INVENTION

A typical mining operation consists of one or more pits where raw material is excavated and transported to the top of each pit. Once at the top of the pit, a decision has to be made as to where to send the material. In the general case, high grade material is sent directly to the product stream to earn revenue and low grade material is sent to waste. Intermediate grade material that is not economic to process immediately can be optionally sent to a dynamic stockpile for reclamation and sale at a later date.

Optimisation of a mining schedule to determine where to mine and what material is sent to product, waste, or to stockpile is determined in order to assign a net present value (NPV) to the mine. It is desirable to optimise the mining, or extraction sequence, so as to produce optimised cash flows (revenue less costs) over the life of mine (LOM) which yield the greatest net present value.

The LOM mine planning optimisation task is simply stated as determining the following decisions for every year until mining is no longer economic:

which material will be mined (extracted) in each period;
of that that material, what tonnage should be sent to waste, product and dynamic stockpile; and
which material should be reclaimed from the dynamic stockpile and sent to product.

In simple language, a dynamic stockpile is a place where marginal value ore can be placed for later sale. It is usual to define Marginal Value ore as having a grade greater than marginal grade but less than economic grade in a particular period. Marginal grade material is material whose revenue is equal to the cost of processing and marketing. Economic grade material is formally defined as ore an optimal extraction sequence would choose to mine, process and sell in the same period.

Current techniques for modelling dynamic stockpiling within the framework of using mixed integer linear programming optimizer engines define so-called grade bins for material and the optimisation conveniently assumes that individual movements of material in each of a number of grade bins are able to be selectively stored in the stockpile and then retrieved at a later date for sending to product. A grade bin is a volume of material aggregated from individual material movements where those movements consist of material falling within a defined grade range (for example, a copper grade between 0.10 and 0.12%). In this model, any previous ore movement into the dynamic stockpile can be selectively reclaimed exactly as it came in without any dilution at any period in the future, subject to it being economic at the time of reclamation and within the scope of maximizing NPV. In real mining operations, this is obviously an impractical and overly optimistic assumption.

A well-mixed dynamic stockpile is one where material is reclaimed at the average grade of the stockpile as the stockpile is built and reclaimed. The stockpile is assumed to be homogenous at every point. The intrinsic non-linear nature of modelling such a well-mixed dynamic stockpile within a mixed integer linear programming optimization framework is well known.

Our International Application No. PCT/AU2005/000761 describes mining optimisation and a mixed integer linear programming technique for processing information in order to provide extraction schedules and net present value estimations. The contents of this International application is incorporated into this specification by this reference.

The object of the present invention is to provide a methodology whereby a multi-step optimisation procedure is used to build and reclaim from a well-mixed dynamic stockpile which improves overall optimisation of the mining process and which is reasonably tractable.

SUMMARY OF THE INVENTION

The invention may be said to reside in a method of modelling an optimal mine plan on a period basis for the operation over the remaining life of mine, comprising: dividing the life of mine into a plurality of increasing lengths of time; performing a plurality of optimisation steps, with each step being performed once for a predetermined time period of the remaining life of mine, and wherein the optimal mine plan is determined by a concatenation of material movements in each predetermined time period, wherein (a) a decision is made as to which material is extracted from the mine and which of that material is sent to product for the remaining life of mine; (b) sending of material less than the marginal grade to waste; and (c) requiring in the remaining life of mine, after the predetermined period of time of each step, the sending of all material not sent to product to waste.

The method according to the invention produces a tractable way to model the mining optimisation. Although there are multiple life of mine optimisations to be formed, one for each first period, the ultimate time taken is quite modest, since the number of periods used in each optimisation will be much smaller than in the conventional one-off formulation because the period length increases with time. The optimal schedule will be represented by a period by period extraction schedule consisting of the concatenation of the movements in each of the first periods of the optimization steps, compared to the one-off optimisation formulation of conventional techniques where later periods would generally be multi-year in length to ensure tractability.

Preferably the method further comprises, after each optimisation step: recording as a single entry in a life of mine optimal schedule, material movements, revenues and costs for the predetermined period of time of the current optimisation step; and updating mining models to reflect material extracted in the predetermined period of time.

Preferably said first period is incremented by one further first period and the next optimisation step begins at this said second period using a smaller mine.

The invention may also be said to reside in an apparatus for modelling an optimal mine plan on a period basis for the operation over the remaining life of mine, comprising a processor for: dividing the life of mine into a plurality of increasing lengths of time; performing a plurality of optimisation steps, with each step being performed once for a predetermined time period of the remaining life of mine, and wherein the optimal mine plan is determined by the concatenation of material movements in each predetermined time period, wherein: (a) a decision is made as to which material is extracted from the mine and which of that material is sent to product for the remaining life of mine; (b) allowing the sending of material less than the marginal grade to waste; and (c) requiring in the remaining life of mine, after the predetermined period of time of each step, the sending of all material not sent to product to waste.

Preferably the processor is also for, after each optimisation step: recording as a single entry in a life of mine optimal schedule, material movements, revenues and costs for the predetermined period of time of the current optimisation step; and updating mining models to reflect material extracted in the predetermined period of time.

Preferably said first period is incremented by one further first period and the next optimisation step begins at this said second period using a smaller mine.

In an alternative embodiment, in each optimisation step, the movement of material to product is fixed for that predetermined period and is included in the next optimisation step.

The invention may also be said to reside in a computer program for modelling an optimal mine plan on a period basis for the operation over the remaining life of mine, comprising: code for dividing the life of mine into a plurality of increasing lengths of time; code for performing a plurality of optimisation steps, with each step being performed once for a predetermined time period of the remaining life of mine, and wherein the optimal mine plan is determined by the concatenation of material movements in each predetermined time period, wherein: (a) a decision is made as to which material is extracted from the mine and which of that material is sent to product for the remaining life of mine; (b) allowing the sending of material less than the marginal grade to waste; and (c) requiring in the remaining life of mine, after the predetermined period of time of each step, the sending of all material not sent to product to waste.

Preferably the program further comprises code for, after each optimisation step: recording as a single entry in a life of mine optimal schedule, material movements, revenues and costs for the predetermined period of time of the current optimisation step; and updating mining models to reflect material extracted in the predetermined period of time.

The invention may also be said to reside in a method of modelling the building and reclamation of material from a well-mixed dynamic stockpile produced during a mining operation in order to obtain at any actual point in the mine life an optimal mine plan on a period basis for the operation over the remaining life of mine, comprising: performing an optimisation step once for each predetermined time period of the remaining life of mine, and during each optimisation step, stepping forward one predetermined time period at a time; and (a) deciding which material is extracted from the mine and which of that material is sent to product in each time period for the remaining life of mine; (b) allowing, only in the predetermined period of each step, the sending of material with a grade greater than a marginal grade that is not sent to product to the dynamic stockpile, and sending all material less than the marginal grade to waste; (c) in the remaining life of mine, after the predetermined period, requiring the sending of all material not sent to product to waste; and determining an initial movement of material to and from the stockpile and to and from the mine to product over the life of mine in increasing lengths of time.

Preferably the method further comprises, after each optimisation step: recording as a single entry in a life of mine optimal schedule, material movements, revenues and costs for the predetermined period of time of the current optimisation step; updating mining models to reflect material extracted in the predetermined period of time; updating the dynamic stockpile state and grade to reflect material moved into and/or extracted from the stockpile in the said predetermined period of time of the optimisation step just completed.

Preferably the dynamic stockpiles are homogenised during the updating of the dynamic stockpile state and grade.

Preferably said first period is incremented by one further first period and the next optimisation step begins at this said second period using a smaller mine and the adjusted dynamic stockpile.

In an alternative embodiment, in each optimisation step, the movement of material to product and to and from the dynamic stockpile is fixed for that predetermined period and is included in the next optimisation step.

Most preferably the said first period of time is one year.

In one example, the increasing lengths of time are of duration one year, one year, one year, one year, two years, two years, two years, ten years, ten years. In another example, the years are one year, one year, two years, five years, ten years, twenty years. Additional larger year periods can be added on to deal with longer mine lives (i.e. same as given previously with a further period of fifty years).

Preferably, if there are N years in the life of mine years and the first period of time is one year, there will be N optimisation steps in the overall optimal mine planning process. The final life of mine optimal schedule will consist of the concatenation of the material movements in the first period of each of these N optimisation steps. A convenient implementation is to treat each additional new period of the life of pit optimal schedule as a period in the subsequent optimisation, but with its extraction variables (material movement) predefined within the overall optimisation. In this case, each optimisation step will cover the full life of mine, but with increasingly more of the early years in the mine-life constrained to fixed extractions or movements. This is convenient in that it obviates the requirements to recursively update the pit models as material is gradually extracted from them in each optimisation step.

The invention may also be said to reside in a method of modelling the building and reclamation of material from a well-mixed dynamic stockpile produced during a mining operation in order to obtain an actual point in the mine life an optimal mine plan on a period basis for the operation over the remaining life of mine, comprising: dividing the life of mine into a plurality of increasing lengths of time; performing a plurality of optimisation steps, with each step being performed once for a predetermined time period of the remaining life of mine, and wherein the optimal mine plan is determined by the concatenation of material movements in each predetermined time period, wherein: (a) a decision is made as to which material is extracted from the mine and which of that material is sent to product for the remaining life of mine; (b) allowing, in the predetermined period of time of each step, the sending of material with a grade greater than a marginal grade that is not sent to product to the dynamic stockpile, and the sending of material less than the marginal grade to waste; (c) requiring in the remaining life of mine, after the predetermined period of time of each step, the sending of all material not sent to product to waste; and (d) sending to product material from the dynamic stockpile only in the said predetermined period of time of each step.

Preferably the method further comprises, after each optimisation step: recording as a single entry in a life of mine optimal schedule, material movements, revenues and costs for the predetermined period of time of the current optimisation step; updating mining models to reflect material extracted in the predetermined period of time; updating the dynamic stockpile state and grade to reflect material moved into and/or extracted from the stockpile in the said predetermined period of time of the optimisation step just completed.

Preferably the dynamic stockpiles are homogenised during the updating of the dynamic stockpile state and grade.

Preferably said first period is incremented by one further first period and the next optimisation step begins at this said second period using a smaller mine and the adjusted dynamic stockpile.

In an alternative embodiment, in each optimisation step, the movement of material to product and to and from the dynamic stockpile is fixed for that predetermined period and is included in the next optimisation step.

The invention may also be said to reside in an apparatus for modelling the building and reclamation of material from a well-mixed dynamic stockpile produced during a mining operation in order to obtain at any actual point in the mine life an optimal mine plan on a period basis for the operation over the remaining life of mine, comprising: a processor for performing an optimisation step once for each predetermined time period of the remaining life of mine, and during each optimisation step, stepping forward one predetermined time period at a time; and (a) deciding which material is extracted from the mine and which of that material is sent to product in each time period for the remaining life of mine; (b) allowing, only in the predetermined period of each step, the sending of material with a grade greater than a marginal grade that is not sent to product to the dynamic stockpile, and sending all material less than the marginal grade to waste; (c) in the remaining life of mine, after the predetermined period, requiring the sending of all material not sent to product to waste; and determining an initial movement of material to and from the stockpile and to and from the mine to product over the life of mine in increasing lengths of time.

Preferably the processor is also for, after each optimisation step: recording as a single entry in a life of mine optimal schedule, material movements, revenues and costs for the predetermined period of time of the current optimisation step; updating mining models to reflect material extracted in the predetermined period of time; updating the dynamic stockpile state and grade to reflect material moved into and/or extracted from the stockpile in the said predetermined period of time of the optimisation step just completed.

Preferably the dynamic stockpiles are homogenised during the updating of the dynamic stockpile state and grade.

Preferably said first period is incremented by one further first period and the next optimisation step begins at this said second period using a smaller mine and the adjusted dynamic stockpile.

In an alternative embodiment, in each optimisation step, the movement of material to product and to and from the dynamic stockpile is fixed for that predetermined period and is included in the next optimisation step.

Most preferably the said first period of time is one year.

In one example, the increasing lengths of time are of duration one year, one year, one year, one year, two years, two years, two years, ten years, ten years.

The invention may also be said to reside in an apparatus for modelling the building and reclamation of material from a well-mixed dynamic stockpile produced during a mining operation in order to obtain an actual point in the mine life an optimal mine plan on a period basis for the operation over the remaining life of mine, comprising a processor for: dividing the life of mine into a plurality of increasing lengths of time; performing a plurality of optimisation steps, with each step being performed once for a predetermined time period of the remaining life of mine, and wherein the optimal mine plan is determined by the concatenation of material movements in each predetermined time period, wherein: (a) a decision is made as to which material is extracted from the mine and which of that material is sent to product for the remaining life of mine; (b) allowing, in the predetermined period of time of each step, the sending of material with a grade greater than a marginal grade that is not sent to product to the dynamic stockpile, and the sending of material less than the marginal grade to waste; (c) requiring in the remaining life of mine, after the predetermined period of time of each step, the sending of all material not sent to product to waste; and (d) sending to product material from the dynamic stockpile only in the said predetermined period of time of each step.

Preferably the processor is also for, after each optimisation step: recording as a single entry in a life of mine optimal schedule, material movements, revenues and costs for the predetermined period of time of the current optimisation step; updating mining models to reflect material extracted in the predetermined period of time; updating the dynamic stockpile state and grade to reflect material moved into and/or extracted from the stockpile in the said predetermined period of time of the optimisation step just completed.

Preferably the dynamic stockpiles are homogenised during the updating of the dynamic stockpile state and grade.

Preferably said first period is incremented by one further first period and the next optimisation step begins at this said second period using a smaller mine and the adjusted dynamic stockpile.

In an alternative embodiment, in each optimisation step, the movement of material to product and to and from the dynamic stockpile is fixed for that predetermined period and is included in the next optimisation step.

The invention may also be said to reside in a computer program for modelling the building and reclamation of material from a well-mixed dynamic stockpile produced during a mining operation in order to obtain at any actual point in the mine life an optimal mine plan on a period basis for the operation over the remaining life of mine, comprising: code for performing an optimisation step once for each predetermined time period of the remaining life of mine, and during each optimisation step, stepping forward one predetermined time period at a time; and (a) deciding which material is extracted from the mine and which of that material is sent to product in each time period for the remaining life of mine; (b) allowing, only in the predetermined period of each step, the sending of material with a grade greater than a marginal grade that is not sent to product to the dynamic stockpile, and sending all material less than the marginal grade to waste; (c) in the remaining life of mine, after the predetermined period, requiring the sending of all material not sent to product to waste; and code for determining an initial movement of material to and from the stockpile and to and from the mine to product over the life of mine in increasing lengths of time.

Preferably the program further comprises code for, after each optimisation step: recording as a single entry in a life of mine optimal schedule, material movements, revenues and costs for the predetermined period of time of the current optimisation step; updating mining models to reflect material extracted in the predetermined period of time; updating the dynamic stockpile state and grade to reflect material moved into and/or extracted from the stockpile in the said predetermined period of time of the optimisation step just completed.

Preferably the dynamic stockpiles are homogenised during the updating of the dynamic stockpile state and grade.

Preferably said first period is incremented by one further first period and the next optimisation step begins at this said second period using a smaller mine and the adjusted dynamic stockpile.

In an alternative embodiment, in each optimisation step, the movement of material to product and to and from the dynamic stockpile is fixed for that predetermined period and is included in the next optimisation step.

Most preferably the said first period of time is one year.

In one example, the increasing lengths of time are of duration one year, one year, one year, one year, two years, two years, two years, ten years, ten years.

Preferably, if there are N years in the life of mine years, there will be N optimisation steps in the overall optimal mine planning process. The final life of mine optimal schedule will consist of the concatenation of the material movements in the first year of each of these N optimisation steps. A convenient implementation is to treat each additional new year of the life of pit optimal schedule as a period in the subsequent optimisation, but with its extraction variables (material movement) predefined within the overall optimisation. In this case, each optimisation step will cover the full life of mine, but with increasingly more of the early years in the mine-life constrained to fixed extractions or movements. This is convenient in that it obviates the requirements to recursively update the pit models as material is gradually extracted from them in each optimisation step.

The invention may also be said to reside in a computer program for modelling the building and reclamation of material from a well-mixed dynamic stockpile produced during a mining operation in order to obtain an actual point in the mine life an optimal mine plan on a period basis for the operation over the remaining life of mine, comprising: code for dividing the life of mine into a plurality of increasing lengths of time; code for performing a plurality of optimisation steps, with each step being performed once for a predetermined time period of the remaining life of mine, and wherein the optimal mine plan is determined by the concatenation of material movements in each predetermined time period, wherein: (a) a decision is made as to which material is extracted from the mine and which of that material is sent to product for the remaining life of mine; (b) allowing, in the predetermined period of time of each step, the sending of material with a grade greater than a marginal grade that is not sent to product to the dynamic stockpile, and the sending of material less than the marginal grade to waste; (c) requiring in the remaining life of mine, after the predetermined period of time of each step, the sending of all material not sent to product to waste; and (d) sending to product material from the dynamic stockpile only in the said predetermined period of time of each step.

Preferably the program further comprises code for, after each optimisation step: recording as a single entry in a life of mine optimal schedule, material movements, revenues and costs for the predetermined period of time of the current optimisation step; updating mining models to reflect material extracted in the predetermined period of time; updating the dynamic stockpile state and grade to reflect material moved into and/or extracted from the stockpile in the said predetermined period of time of the optimisation step just completed.

Preferably the dynamic stockpiles are homogenised during the updating of the dynamic stockpile state and grade.

Preferably said first period is incremented by one further first period and the next optimisation step begins at this said second period using a smaller mine and the adjusted dynamic stockpile.

In an alternative embodiment, in each optimisation step, the movement of material to product and to and from the dynamic stockpile is fixed for that predetermined period and is included in the next optimisation step.

BRIEF DESCRIPTION OF THE DRAWINGS

Preferred embodiments of the invention will be described, by way of example, with more detail in conjunction with the following drawings in which.

DETAILED DESCRIPTION OF THE PREFERRED EMBODIMENT

Figure 1:
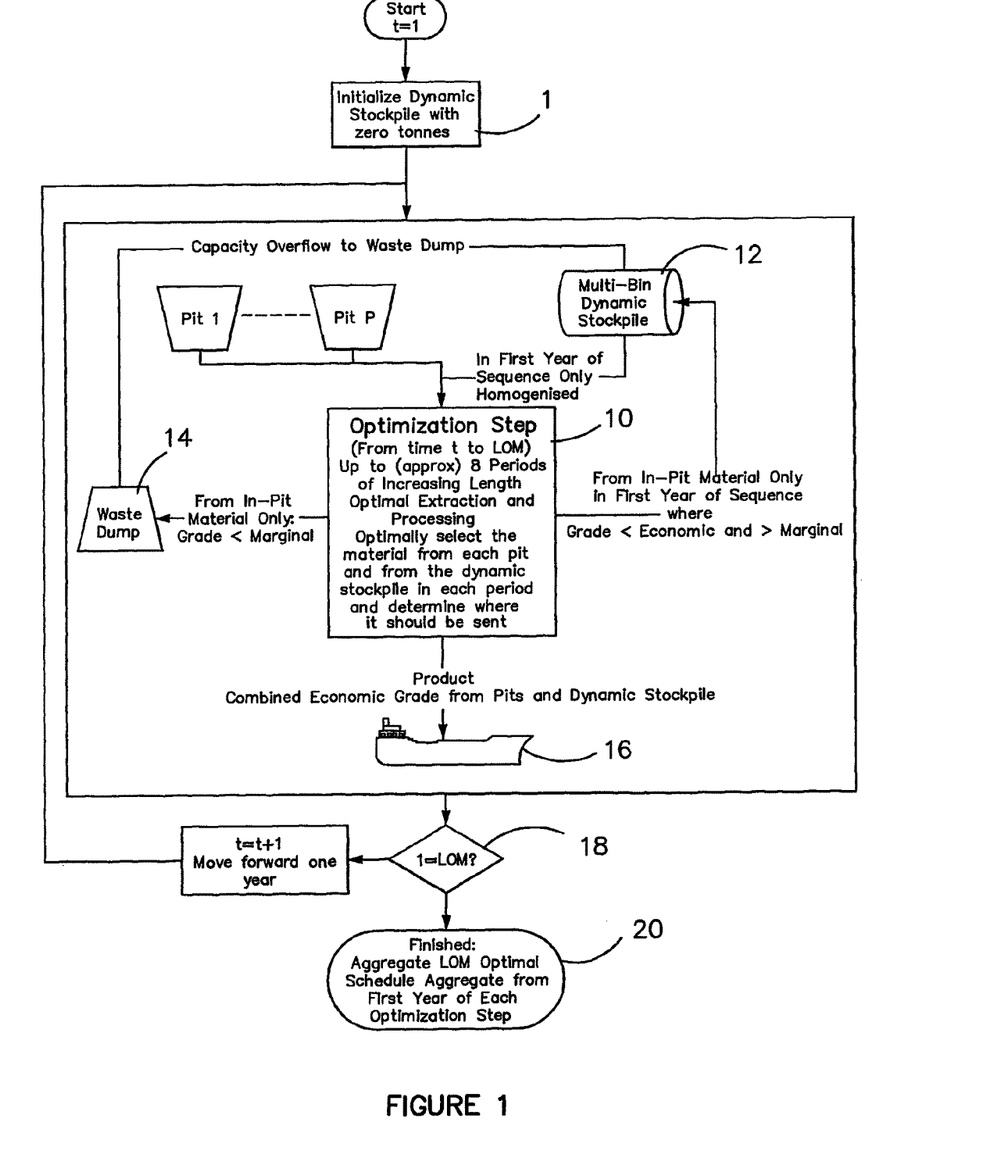
FIG. 1 is a diagram illustrating the movements of material over the life of mine from the mine and to and from the dynamic stockpile.

With reference to FIG. 1, a mine which comprises a number of pits Pit 1 to Pit P is shown together with a schematic representation shown mining of the pits in accordance with a mining optimisation schedule.

A decision is made as to whether the material is sent to product, sent to waste or sent to a dynamic stockpile 12. The dynamic stockpile 12 may comprise a plurality of bins in which various grades of material are deposited. Each bin in the dynamic stockpile is assigned zero tones initially and a maximum tonnage capacity is also defined (step 1).

An optimisation step is undertaken once for each year of the life of mine, stepping forward by one year at a time throughout the whole life of mine. During each optimisation step, the mixed integer linear programming decides which material is extracted from each pit and which of that is sent to product (this defines what is economic) in each period for the remaining life of mine. This optimisation step is shown in block 10 of FIG. 1. In the first year of this sequence, material with grade greater than marginal grade that is not sent to product will be automatically sent to the dynamic stockpile 12. The material sent to the dynamic stockpile is assumed to be sent there at the end of the first year. Also in that first year, all material that is of a grade less than the marginal grade will be sent to waste 14. In this first year, material can be taken from the dynamic stockpile and sent to product at the average grade of the appropriate bin in the stockpile as measured at the start of the first period.

In all subsequent periods, all material not sent to product will be sent to waste 14. If any bin in the dynamic stockpile reaches its maximum capacity, then any excess material in that grade range not sent to product must be permanently sent to waste 14. The optimisation step allows material to be taken from the stockpile 12 and sent to product only in the first year of the sequence (assumed to be taken at the start of the year). Material is taken from the dynamic stockpile at the average grade in each grade bin of the dynamic stockpile 12 as measured at the start of the first period.

The optimizer calculates the extraction sequence over the life of mine, but uses periods of increasing length. For example, the standard period length schedule may be one, one, one, one, two, two, two, ten and ten years. The period length of the first period most preferably is one year.

A determination is made as to whether the particular total period t equals the life of mine at step 18. If not, then the time period t is incremented by one year and the next optimisation step for the next year is performed. If t equals the life of mine, an aggregate life of mine optimal schedule aggregated from first year of each optimisation step is determined at step 20.

Figure 2:
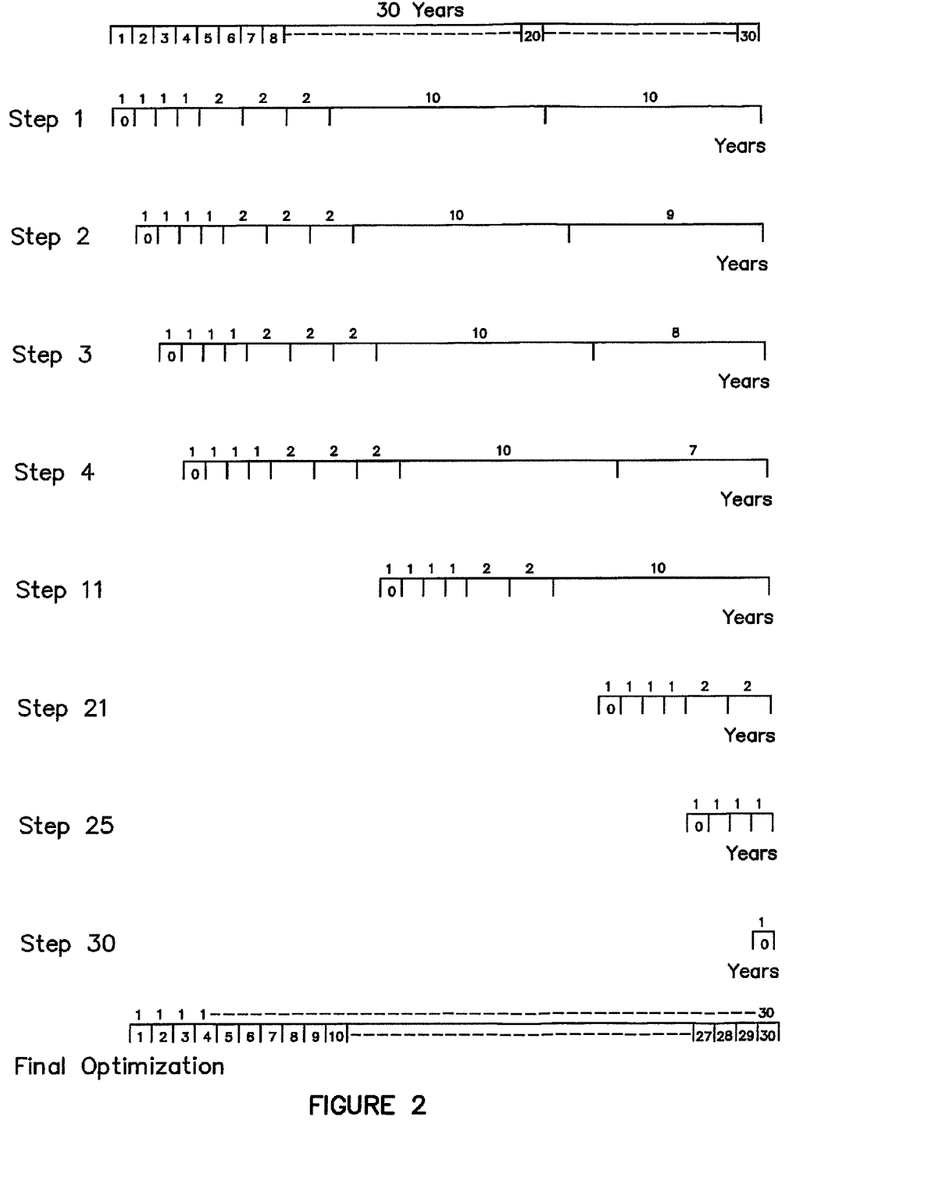
FIG. 2 is a diagram illustrating one embodiment of the invention.

FIG. 2 shows a diagram in which the life of mine is 30 years and 30 optimisation steps are performed. The 30 year life of mine is initially divided up into time periods which increase in length over the life of mine. FIG. 2 shows the example referred to above in which the life of mine is divided into four 1 year periods, two 2 year periods, and two 10 year periods. Thus, the life of mine is initially divided into periods of time which increase in length. As is clear from the above and from FIG. 2, some of the periods may be the same.

At step 1 shown in FIG. 2, which is the first year of the life of mine, material may be sent to product or to or from the dynamic stockpile or to waste. This is shown by the zero in step 1 of FIG. 2. In the remaining life of mine after the first year in step 1, all material is either sent to product or sent to waste, but there is no movement to or from the dynamic stockpile.

At step 2, a further optimisation step is performed by advancing the division of the life of mine of step 1 by the first period of one year. Thus, the remaining life of mine is then divided into four 1 year periods, two 2 year periods a 10 year period and a 9 year period. A further optimisation is performed with the same constraints as referred to above, in that in the first year of step 2 (year 2 of the life of mine), material may be sent to product, to waste or to and from the dynamic stockpile. In the remaining life of mine, material is only moved to waste or to product, but there is no movement to or from the dynamic stockpile.

At step 3, a further optimisation is performed by again advancing the divided life of mine from step 1 by a further 1 year. Thus, the remaining life of mine is divided into four 1 year periods, two 2 year periods, a 10 year period, and an 8 year period. The optimisation is again performed in the same manner as referred to in step 2. Thus, for step 3, material is only sent to or reclaimed from the stockpile during the first period of step 3, which will be the third year of the life of mine. This continues for each year of the life of mine, so that 30 optimisation steps are performed wherein, in the first year of each optimisation step, material is allowed to be moved to and from the dynamic stockpile, but in the remaining period of time of each step, no material movement occurs to or from the stockpile.

A final optimisation for the life of mine is determined by the concatenation of each of the first 1 year periods of time of each of the 30 steps so that 30 one year periods over the life of mine are effectively added together to form the final optimisation.

In this embodiment of the invention, the pit models for each optimisation step are updated having regard to the material which is moved during the subsequent optimisation step. Thus, when step 2 is performed, the mine pit models are updated having regard to the movement of material during the previous optimisation step.

Figure 3:
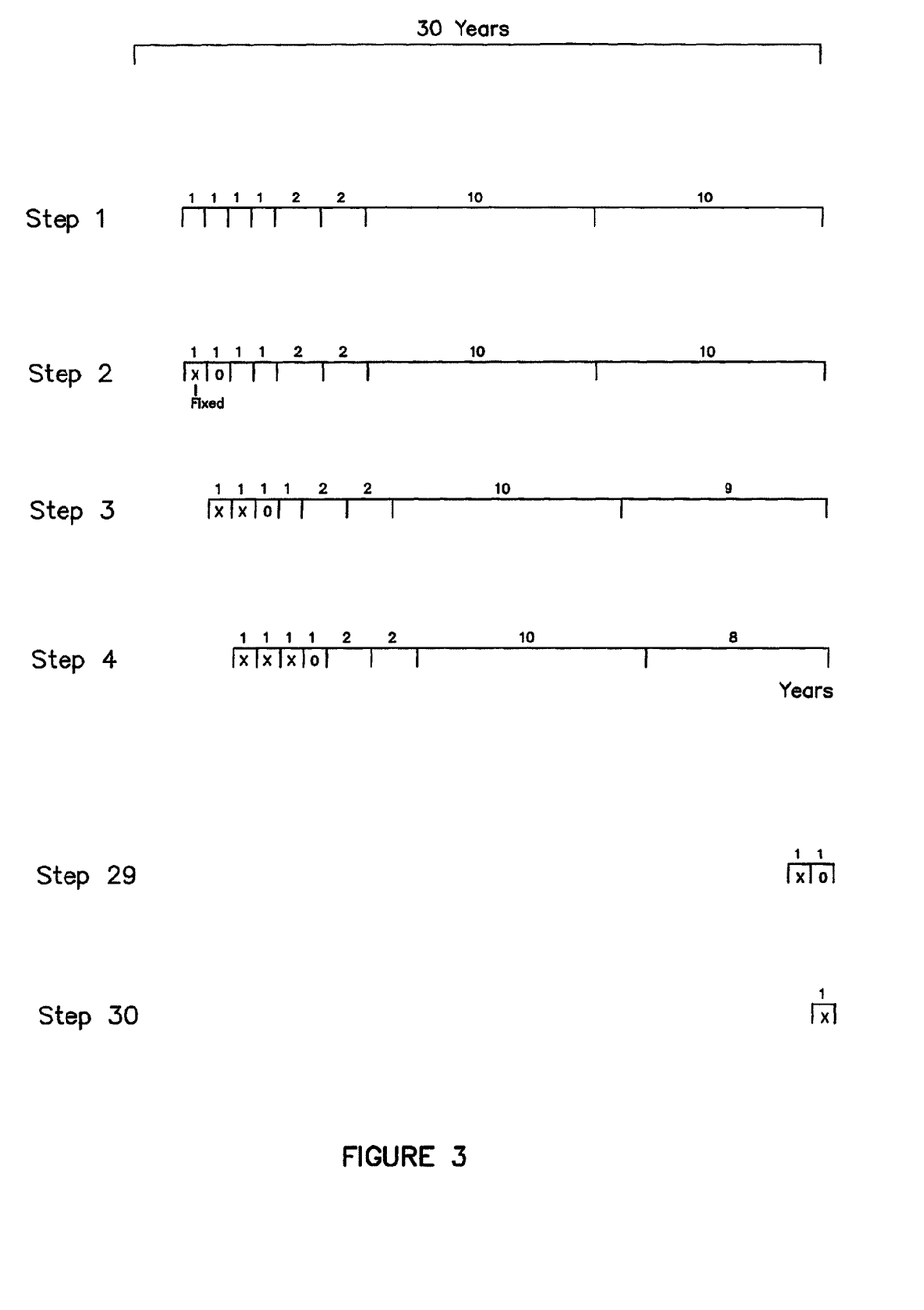
FIG. 3 is a diagram illustrating an alternative embodiment of the invention.

In an alternative embodiment of the invention, the same effect is achieved by using the same pit models for each optimisation step. Once again, in this embodiment, the life of mine is divided into the same periods as in FIG. 2 and a first optimisation step is performed in the same manner as in FIG. 2. In step 2, the material movements in the first period of time are fixed to those values calculated for that period in the first optimisation step and in the next 1 year period of time, material is able to move to and from the dynamic stockpile. Thus, in this embodiment, material movement to and from the dynamic stockpile occurs in the first period of time following the last fixed period of time.

In step 3, the material movements in the second 1 year period of time are also fixed to those values calculated for that period in the second optimisation step and the movement of material therefore occurs in the third one year period of time. In step 4, the material movements in the third year are fixed to those values calculated for that period in the third optimisation step and the material of movement to and from the dynamic stockpile occurs in the fourth 1 year period of time. In each of the steps in FIG. 3, the remaining life of mine is advanced by 1 year as in the embodiment of FIG. 2, so that again 30 optimisation steps will occur. In step 30, the movements of material are fixed.

Thus, once again, the optimum pit model is determined by the concatenation of each of the 30 fixed steps.

In each optimisation step, it is only in the first year that the dynamic stockpile is active. This provides a sort of greedy optimisation of the dynamic stockpiling features which will be most valid for non-blended mining operation where grade bins are used in the dynamic stockpile, it is assumed that well mixed material from each of these grade bins in the dynamic stockpile can be reclaimed independently. The dynamic stockpile is actually a set of individual stockpiles, one for each grade bin, each is reclaimed at the homogenous grade within the individual stockpile bin as calculated at the start of each period.

Where dynamic stockpile capacity constraints allow, all material lying between marginal and economic grade levels will be sent to stockpile. This may not necessarily be globally optimal in cases such as where blended ore targets are applied to products, but should be satisfactory for single-grade (base-metals type operations). However, the configuration becomes more valid where a greater number of grade bins are used in the dynamic stockpile.

This approach may also allow stockpile size to increase rapidly in the early years of the mine life in an optimised schedule. Thus, it is necessary to apply a practical limit to stockpile capacity.

It is also assumed that the cost of sending to the dynamic stockpile is similar to the cost of sending to the waste dump. It is possible that the dynamic stockpile 12 will be non-empty at the end of the mine life, in which case the material remaining is never sent to product and is ipso-facto waste.

The preferred embodiment of the invention, including embodiments using stockpiling and no stockpiling, allow any appropriate solution method, including standard MILP solvers. Specifically, the results presented in FIGS. 4 and 5 were obtained using the commercial package CPLEX. Seven tests were carried out for a practical mine planning problem, each test using a different number of units of aggregation. Care was taken during the aggregation process to ensure that conditions were equivalent. The total return is denoted here as NPV (Net Present Value). All NPVs presented are within 0.1% of their respective optimal value, save for the case where the number of aggregation units was 1632. In the latter case, the NPV is within 0.57% of the optimal value.

Figure 4:
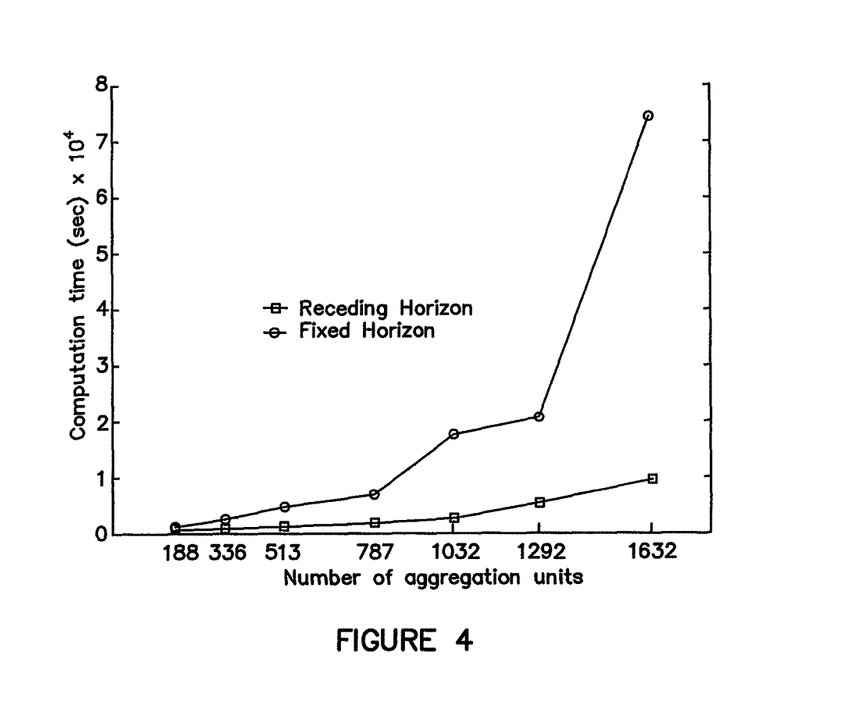
FIG. 4 is a graph comparing the present method with a fixed horizon method.
Figure 5:
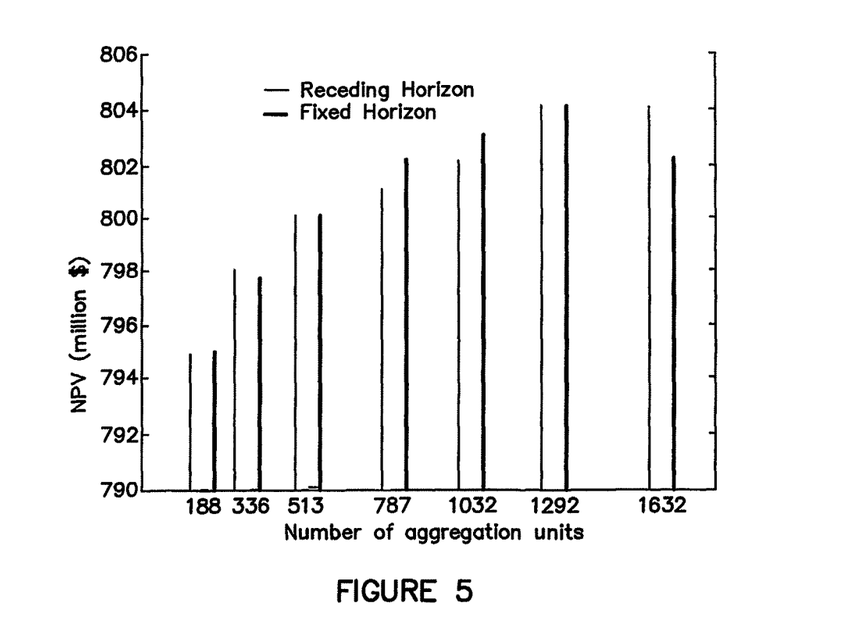
FIG. 5 is a graph showing net present value achieved with receding horizon according to the preferred embodiment of the present invention and fixed horizon techniques.

FIGS. 4 and 5 relate to optimisation of mining with no stockpiling. FIG. 4 shows computation times, in seconds, as a function of aggregation units. There is an order of magnitude difference in computation time for aggregation units 1632 and the gap is growing. The receding horizon approach results in only a very small loss in NPV as shown in FIG. 5. Moreover, at aggregation units of 1632, the receding horizon approach has resulted in a larger NPV due to computational difficulties with the fixed horizon solution.

In the claims which follow and in the preceding description of the invention, except where the context requires otherwise due to express language or necessary implication, the word "comprise", or variations such as "comprises" or "comprising", is used in an inclusive sense, i.e. to specify the presence of the stated features but not to preclude the presence or addition of further features in various embodiments of the invention.

Since modifications within the spirit and scope of the invention may readily be effected by persons skilled within the art, it is to be understood that this invention is not limited to the particular embodiment described by way of example hereinabove.

The invention claimed is:

1. A method of generating mine plan data for operation of a mine, comprising:
   (a) obtaining mine data describing material in the mine which may be removed from the mine over a whole life of the mine;
   (b) dividing, while a current remaining life of mine is longer than a defined time period, the current remaining life of mine into a plurality of time periods comprising a first time period and a plurality of subsequent time periods at least some of which are longer than the first time period such that the subsequent time periods tend to increase relative to the first time period;
   (c) generating mine plan data for the current remaining life of mine by iterating through each of the plurality of time periods and
      (i) determining for each of the plurality of time periods which material is to be extracted from the mine and which of that material is to be sent to product for the remaining life of mine;
      (ii) determining for each of the plurality of time periods which material is less than a marginal grade and is to be sent to waste; and
      (iii) requiring in each of the subsequent time periods, all material not sent to product be sent to waste;
   (d) storing first time period data of the mine plan data generated in step (c);
   (e) updating the current life of mine to begin after the first time period;
   (f) repeating steps (b) to (e) for the whole life of mine; and
   (g) concatenating the first time period data stored in each step (d) to form whole life of mine plan data describing planned material movements for the whole life of mine.

2. An apparatus for generating mine plan data for operation of a mine, the apparatus comprising a processor arranged to:
   (a) receive mine data describing material in the mine which may be removed from a mine over a whole life of the mine;
   (b) divide, while a current remaining life of mine is longer than a defined time period, the current remaining life of mine into a plurality of time periods comprising a first time period and a plurality of subsequent time periods at least some of which are longer than the first time period such that the subsequent time periods tend to increase relative to the first time period;
   (c) generate mine plan data for the current remaining life of mine by iterating through each of the plurality of time periods and:
      (i) determine for each of the plurality of time periods which material is to be extracted from the mine and which of that material is to be sent to product for the remaining life of mine;
      (ii) determine for each of the plurality of time periods which material is less than a marginal grade and is to be sent to waste; and
      (iii) require for the purpose of generating the mine plan data that in each of the subsequent time periods all material not sent to product be sent to waste
   (d) store first time period data of the mine plan data generated in step (c);
   (e) update the current life of mine to begin after the first time period;
   (f) repeat steps (b) to (e) for the whole life of mine; and
   (g) concatenate the first time period data stored in each step (d) to form whole life of mine plan data describing planned material movements for the whole life of mine.

3. The method of claim 1 comprising, in step (c), determining, for only the first time period, which material greater than a marginal grade but less than a product grade is to be sent to a stockpile.

4. The method of claim 3, comprising, in iterations subsequent to a first occasion on which first time period data is stored, determining which material from the stockpile is to be combined with material extracted from the mine and sent to product.

5. The method of claim 1, comprising updating the mine data describing the mine subsequent to each step (c) to reflect material extracted in the first time period such that each time steps (b) to (e) are repeated it is on the basis of updated mine data.

6. A method of mining comprising extracting material from a mine based on whole life of mine plan data produced in accordance with the method of claim 1.

7. The apparatus of claim 2 arranged to determine, for only the first time period when generating mine plan data for the current remaining life of mine, which material greater than a marginal grade but less than a product grade is to be sent to a stockpile.

8. The apparatus of claim 7, arranged to, in iterations subsequent to a first occasion on which first time period data is stored, determine which material from the stockpile is to be combined with material extracted from the mine and sent to product.

9. The apparatus of claim 2 arranged to update the mine data describing the mine subsequent to generating mine plan data for the current remaining life of mine to reflect material extracted in the first time period such that subsequent iterations are on the basis of updated mine data.

* * * * *

UNITED STATES PATENT AND TRADEMARK OFFICE
CERTIFICATE OF CORRECTION

| | | |
|---|---|---|
| PATENT NO. | : 7,853,439 B2 | Page 1 of 1 |
| APPLICATION NO. | : 11/860170 | |
| DATED | : December 14, 2010 | |
| INVENTOR(S) | : Menabde et al. | |

It is certified that error appears in the above-identified patent and that said Letters Patent is hereby corrected as shown below:

<u>On The Face Page, Item (63) and at Column 1, lines 4 and 5,</u>

Please delete "Oct. 19, 2006" and replace it with --March 29, 2006--.

Signed and Sealed this
Fourteenth Day of June, 2011

David J. Kappos
*Director of the United States Patent and Trademark Office*